(12) United States Patent
Matsuda et al.

(10) Patent No.: US 11,501,631 B2
(45) Date of Patent: Nov. 15, 2022

(54) FIRE ALARM SYSTEM AND BOOSTER

(71) Applicant: HOCHKI CORPORATION, Tokyo (JP)

(72) Inventors: Yoshihiro Matsuda, Tokyo (JP); Shigeru Kaneko, Tokyo (JP); Takehiro Ono, Tokyo (JP); Akira Ishida, Tokyo (JP)

(73) Assignee: HOCHIKI CORPORATION, Tokyo (JP)

( * ) Notice: Subject to any disclaimer, the term of this patent is extended or adjusted under 35 U.S.C. 154(b) by 0 days.

(21) Appl. No.: 17/330,708

(22) Filed: May 26, 2021

(65) Prior Publication Data
US 2021/0280046 A1    Sep. 9, 2021

Related U.S. Application Data

(63) Continuation of application No. PCT/JP2019/001572, filed on Jan. 21, 2019.

(51) Int. Cl.
*G08B 25/04* (2006.01)
*G08B 25/00* (2006.01)
(Continued)

(52) U.S. Cl.
CPC ........... *G08B 25/04* (2013.01); *G08B 25/003* (2013.01); *G08B 25/14* (2013.01); *G08B 29/06* (2013.01); *H04B 1/44* (2013.01)

(58) Field of Classification Search
CPC ...... G08B 17/00; G08B 25/04; G08B 25/003; G08B 29/06; G08B 17/10; G08B 26/004
See application file for complete search history.

(56) References Cited

U.S. PATENT DOCUMENTS

| 7,142,093 B2 * | 11/2006 | Foster | G08B 26/008 |
| | | | 116/5 |
| 2003/0169154 A1 * | 9/2003 | Matheny | G08B 27/001 |
| | | | 340/506 |

(Continued)

FOREIGN PATENT DOCUMENTS

| JP | 61-74185 | 5/1986 |
| JP | 1-297931 | 12/1989 |

(Continued)

OTHER PUBLICATIONS

Office Action dated Sep. 1, 2021 in Japanese Patent Application No. 2017-238212, with English-language translation.

(Continued)

*Primary Examiner* — Mirza F Alam
(74) *Attorney, Agent, or Firm* — Wenderoth, Lind & Ponack, L.L.P.

(57) ABSTRACT

A fire detector is connected to a loop transmission line connected to a receiver. When the loop transmission line is normal, a transmission unit is connected to the fire detector. When a disconnection failure occurs, a disconnection monitoring unit turns on switching circuits to connect the end of the loop transmission line to the transmission unit, and the receiver connects to the fire detector from both ends of the loop transmission line. An input/output switching booster is inserted and connected in the middle of the loop transmission line, and when the start side transmission line is disconnected and the switching circuits are turned on, the input/output is switched. Accordingly, the input/output switching booster amplifies the down signal input from the terminal side transmission line and outputs it to the start side transmission line and at the same time amplifies the up signal input from the start side transmission line.

12 Claims, 7 Drawing Sheets

(51) Int. Cl.
    *G08B 25/14*         (2006.01)
    *G08B 29/06*         (2006.01)
    *H04B 1/44*          (2006.01)

(56) References Cited

U.S. PATENT DOCUMENTS

2004/0196145 A1*   10/2004   Foster ................ G08B 26/008
                                                                   340/326
2007/0171837 A1     7/2007   Chen et al.

FOREIGN PATENT DOCUMENTS

| JP | 5-217088 | 8/1993 |
|---|---|---|
| JP | 06-259688 | 9/1994 |
| JP | H08 7187 A | 1/1996 |
| JP | 08-044984 | 2/1996 |
| JP | H08 87691 A | 4/1996 |
| JP | 08-336192 | 12/1996 |
| JP | 2008-004033 | 1/2008 |
| JP | 2010-114631 | 5/2010 |

OTHER PUBLICATIONS

International Search Report dated Apr. 16, 2019 in International (PCT) Application No. PCT/JP2019/001572.
Extended European Search Report dated Jul. 22, 2022 in corresponding European Patent Application No. 19911936.3, 10 pages.

* cited by examiner

FIRE ALARM SYSTEM AND BOOSTER

TECHNICAL FIELD

The present invention relates to a fire alarm system and booster for monitoring a fire by connecting a fire detector to a loop transmission line from a receiver.

BACKGROUND ART

Conventionally, in the fire alarm system known as the R type, a terminal device such as a fire detector having a transmission function is connected to a transmission line drawn from the receiver. At the time of fire detection, for example, based on a fire interrupt from a fire detector, the receiver issues a search command to identify the address of the fire detector that has been issued, displays the fire occurrence address, and collects and monitors fire data from the identified fire detector.

In this way, if the address of the fire detector that detected the fire is known, appropriate evacuation guidance and fire extinguishing activities become possible, which is an indispensable function especially for fire monitoring of large-scale equipment.

In addition, a fire alarm system is known to monitor a fire by connecting the fire detector to a loop transmission line connected in a loop to the receiver in order to ensure reliability against disconnection failure of the transmission line drawn from the fire receiver.

Figure 6:
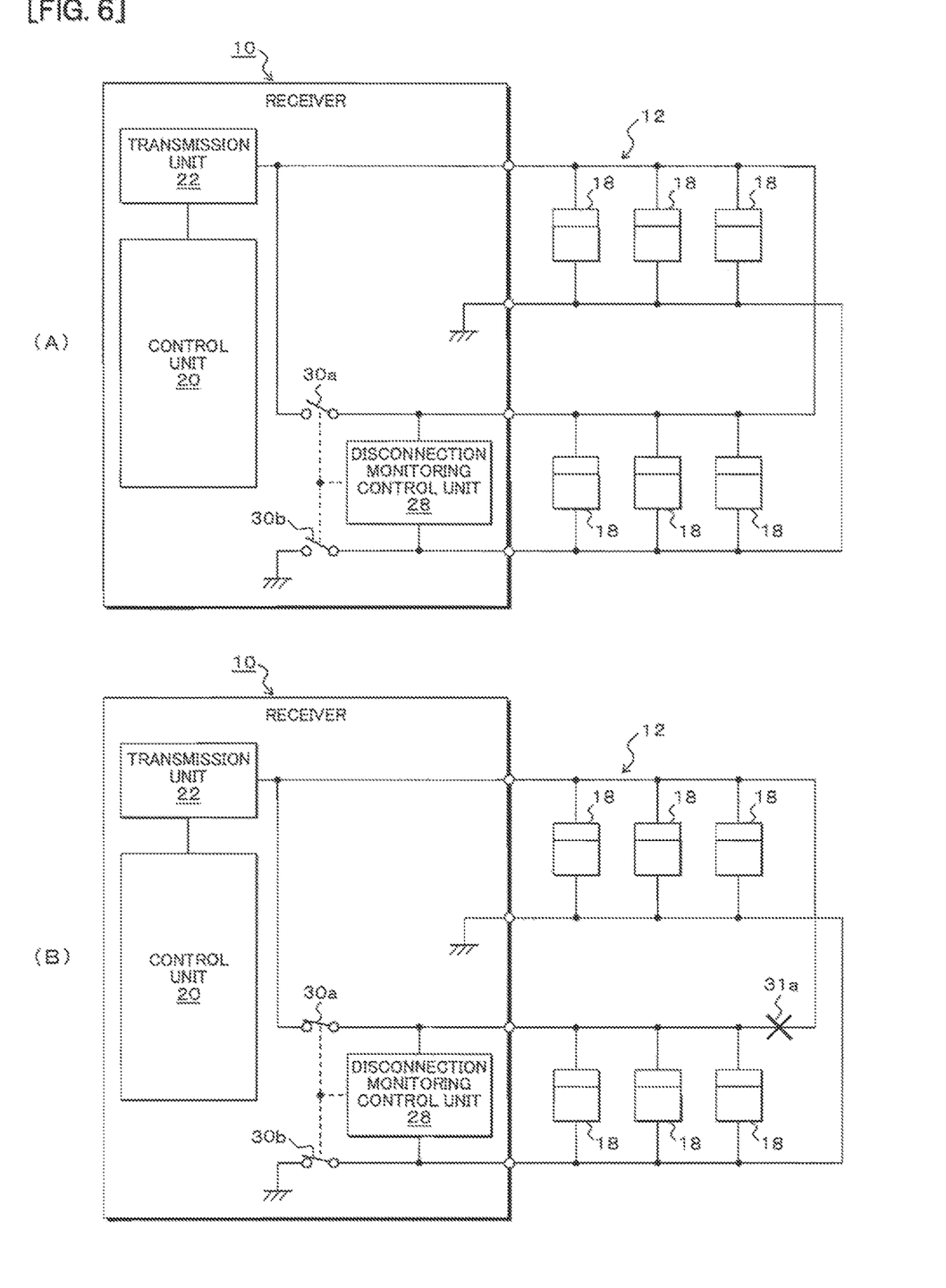
FIG. 6 is an explanatory diagram showing a fire alarm system provided with a conventional loop transmission line.

FIG. 6 is an explanatory diagram of the fire alarm system using the conventional loop transmission line. FIG. 6 (A) shows a normal monitoring state, and FIG. 6 (B) shows a case where a disconnection failure occurs.

As shown in FIG. 6A, a transmission line 12 using a pair of signal lines is drawn out from a transmission unit 22 provided in a receiver 10. The transmission line 12 is arranged in a loop shape that returns to the receiver 10 after being pulled out from the receiver 10. Hereinafter, in the description, the transmission line 12 connected to the receiver 10 in a loop shape is referred to as a loop transmission line 12.

A fire detector 18 having a transmission function is connected between the signal lines of the loop transmission line 12. A unique detector address is set in the fire detector 18. The transmission unit 22 transmits a down signal that changes the line voltage, and the fire detector 18 transmits an up signal that changes the line current to monitor the fire.

A disconnection monitoring control unit 28 is provided at the end of the loop transmission line 12 drawn into the fire receiver 10. The disconnection monitoring control unit 28 monitors the disconnection failure of the loop transmission line 12 based on the line voltage supplied from the transmission unit 22 to the loop transmission line 12. Further, at the end of the loop transmission line 12, switching circuits 30a and 30b for switching and connecting the terminal signal line to the transmission unit 22 are provided. The switching circuits 30a and 30b are in the normal monitoring state and the transmission unit 22 is in the disconnected state.

As shown in FIG. 6B, it is assumed that a disconnection 31a occurs in the middle of the loop transmission line 12 during operation. At this time, the disconnection monitoring control unit 28 detects a disconnection failure due to the disconnection of the line voltage at the end of the loop transmission line 12, operates the switching circuits 30a and 30b, and connects the end side of the loop transmission line 12 to the transmission unit 22.

Therefore, the signal from the transmission unit 22 is transmitted from the terminal side of the loop transmission line 12 to the location where the disconnection 31a occurs via the switching circuits 30a and 30b, and is connected between the location where the disconnection 31a occurs and the terminal of the loop transmission line 12. It is possible to send and receive signals to and from the fire detector 18. As a result, even if a disconnection failure occurs, the fire monitoring function by the fire detector 18 connected to the loop transmission line 12 is not lost, and high reliability can be obtained.

RELATED ART DOCUMENTS

Patent Documents

Patent document 1: JP-A No. 2008-004033
Patent document 2: JP-A No. 2010-114632

DISCLOSURE OF INVENTION

Problems to be Solved by the Invention

By the way, when a fire is monitored by a fire detector connected to a loop transmission line from a receiver, the length of the loop transmission line is approximately twice as long as that of a normal transmission line. The reason for this is that the normal transmission line is pulled out from the receiver toward the monitoring area, whereas the loop transmission line returns the transmission line drawn from the receiver to the monitoring area back to the receiver. Therefore, the line resistance on the terminal side of the loop transmission line also increases. For example, suppose that the transmission line resistance between the transmission unit and the fire detector that can receive the down signal and the up signal is 30 ohms. In this case, in the loop transmission line, the transmission line resistance from the transmission unit to the end becomes 60 ohms, and transmission/reception with a fire detector connected to a transmission line range exceeding 30 ohms becomes impossible. Therefore, it is conceivable to provide a booster in the middle of the loop transmission line.

Figure 7:
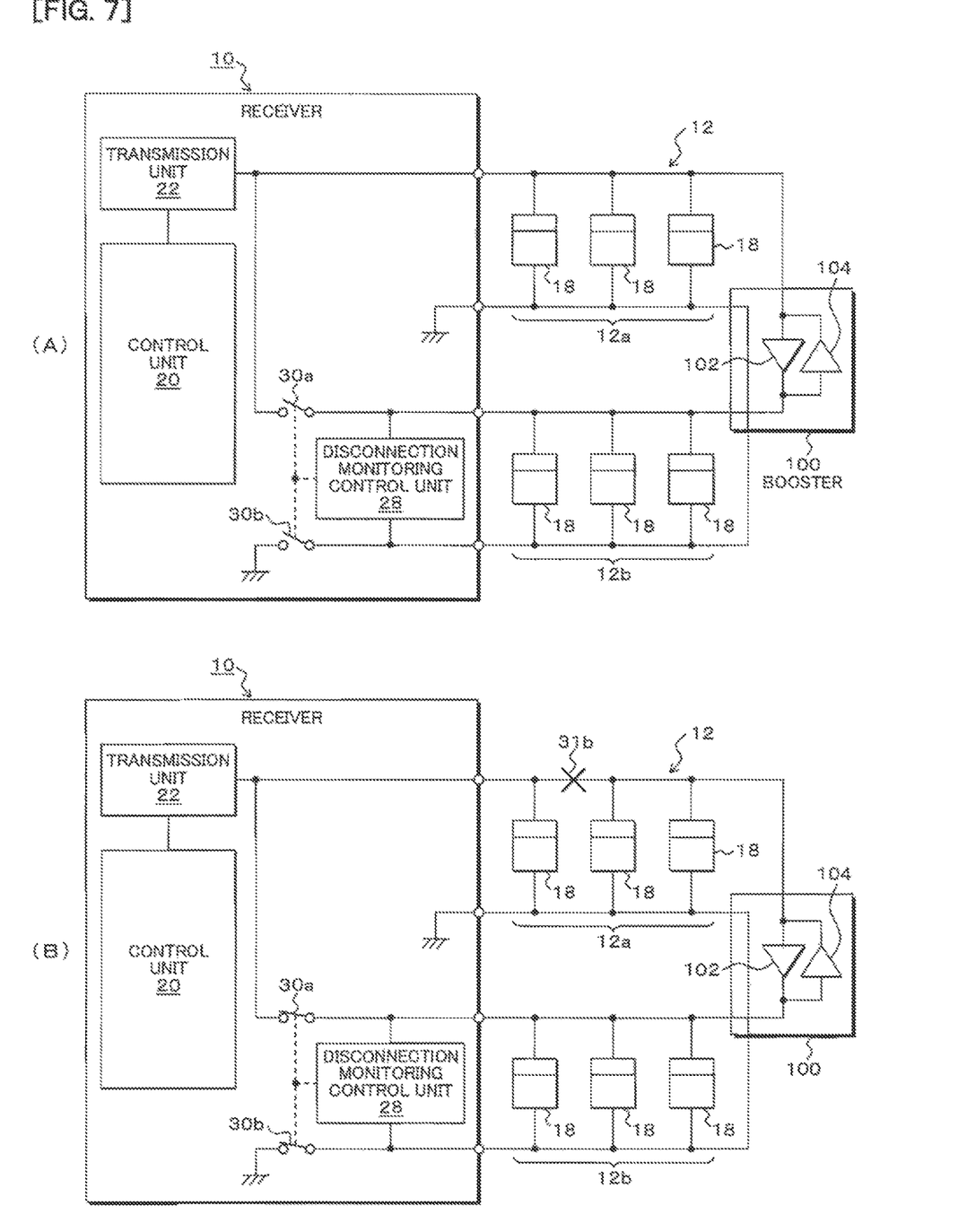
FIG. 7 is an explanatory diagram showing a fire alarm system in which a booster is provided on a conventional loop transmission line.

FIG. 7 is an explanatory diagram showing a fire alarm system in which a booster is provided on a conventional loop transmission line. FIG. 7A shows a normal monitoring state, and FIG. 7B shows a case where a disconnection failure occurs.

As shown in FIG. 7A, the booster 100 is inserted and connected to, for example, a folded position that is half of the loop transmission line 12. Here, the area between the start end of the loop transmission line 14 drawn from the receiver 10 and the booster 100 is referred to as a start side transmission line 12a. Further, the area between the booster 100 and the end of the loop transmission line 12 returned to the receiver 10 is referred to as a terminal side transmission line 12b.

The booster 100 amplifies the down signal input from the start side transmission line 12a by the voltage boost circuit unit 102 and outputs it to the terminal side transmission line 12b. Further, the booster 100 amplifies the up signal input from the terminal side transmission line 12b by the current boost circuit unit 104 and outputs it to the start side transmission line 12a. Therefore, even if the line length of the loop transmission line 12 increases, the booster 100 suppresses a decrease in the signal level between the fire detector 18 connected to the terminal side of the loop transmission line 12 and reliably transmits and receives signals to and from the transmission unit 22.

As shown in FIG. 7B, for example, when a disconnection 31b occurs in the transmission line 12a on the start point side of the loop transmission line 12, the disconnection monitoring control unit 28 operates the switching circuit units 30a and 30b, and connects the terminal side of the loop transmission line 12 to the transmission unit 22.

As a result, the booster 100 amplifies the down signal and the up signal in only one direction by the voltage boost circuit unit 102 and the current boost circuit unit 104, respectively. However, even if the booster 100 is provided on the loop transmission line 12, the down signal transmitted from the terminal side of the loop transmission line 12 via the switching circuit units 30a and 30b cannot pass through the booster 100. Also, the up signal from the fire detector 18 between the booster 100 and the occurrence point of the disconnection 31b cannot pass through the booster 100. Therefore, there is a problem that the fire monitoring function by the fire detector 18 connected between the booster 100 and the occurrence point of the disconnection 31b is lost.

It is an object of the present invention to provide a fire alarm system and booster for enabling fire monitoring by all fire detectors even if a disconnection failure occurs in a loop transmission line provided in the middle of the booster.

Means to Solve the Problems (Fire Alarm System)

The present invention relates to a fire alarm system, wherein a fire detector having a unique address is connected to a loop transmission line that is looped to the receiver or repeater which is connected to the receiver, upon a loop transmission line is normal, a transmission unit of the receiver connected to the start end of the loop transmission line communicates with the fire detector to monitor the fire, and upon a disconnection occurs in the loop transmission line, an end of the loop transmission line is connected to the transmission unit to connect to the fire detector from both ends of the loop transmission line, and communication is performed to monitor a fire, the improvement comprising:

a booster inserted and connected in the middle of the loop transmission line, normally, the booster amplifies a signal input from one side and outputs the signal to the other side, and upon a disconnection occurs in the loop transmission line, the input/output is switched and output.

(Booster Configuration)

The booster amplifies the down signal input from the start side transmission line and outputs to the terminal side transmission line, and at the same time, amplifies the up signal inputs from the terminal side transmission line and outputs to the start side transmission line, and upon a disconnection failure occurs in the start side transmission line, input/output is switched, the down signal input from the terminal side transmission line is amplified and output to the start side transmission line, and at the same time, the up signal input from the start side transmission line is amplified and output to the terminal side transmission line.

(One-Way Booster)

The booster comprising
a down signal boost circuit that amplifies the input down signal in one direction and outputs,
an up signal boost circuit that amplifies the input up signal in one direction and outputs,
a switching circuit having a first switching position and a second switching position,
upon the first switching position, the start side transmission line is connected to the input of the down signal boost circuit, and at the same time, the output of the down signal boost circuit is connected to the terminal side transmission line, and the input of the up signal boost circuit is connected to the terminal side transmission line, and at the same time, the output of the up signal boost circuit is connected to the start side transmission line,
upon the second switching position, the input of the down signal boost circuit is connected to the terminal side transmission line, and at the same time, the output of the down signal boost circuit is connected to the start side transmission line, and the input of the up signal boost circuit is connected to the start side transmission line, and at the same time, the output of the up signal boost circuit is connected to the terminal side transmission line,
a first voltage detector that detects the line voltage of the start side transmission line,
a second voltage detector that detects the line voltage of the terminal side transmission line, and
a booster control unit for controlling the input/output switching circuit,
upon a predetermined line voltage is detected by the first voltage detector and the second voltage detector, the input/output switching circuit is switched to the first switching position, and
upon the predetermined line voltage is not detected by the first voltage detector, and at the same time, the predetermined line voltage is detected by the second voltage detector, the input/output switching circuit is switched to the second switching position.

(Bidirectional Booster)

The booster comprising
a first down signal boost circuit that amplifies the input down signal in one direction and outputs,
a second down signal boost circuit that amplifies the input down signal in the opposite direction and outputs,
a first up signal boost circuit that amplifies the input up signal in one direction and outputs,
a second up signal boost circuit that amplifies the input up signal in the opposite direction and outputs,
an input/output switching circuit having a first switching position and a second switching position,
upon the first switching position, the input of the first down signal boost circuit is connected to the start side transmission line, and at the same time, the output of the first down signal boost circuit is connected to the terminal side transmission line, and the input of the first up signal boost circuit is connected to the terminal side transmission line, and at the same time, the output of the first up signal boost circuit is connected to the start side transmission line,
upon the second switching position, the input of the second down signal boost circuit is connected to the terminal side transmission line, and at the same time, the output of the second down signal boost circuit is connected to the start side transmission line, and the input of the second up signal boost circuit is connected to the start side transmission line, and at the same time, the output of the second up signal boost circuit is connected to the terminal side transmission line,
a first voltage detector that detects the line voltage of the start side transmission line,
a second voltage detector that detects the line voltage of the terminal side transmission line, and a booster control unit for controlling the input/output switching circuit, upon a predetermined line voltage is detected by the first voltage detector and the second voltage detector, the input/output switching circuit is switched to the first switching position, and upon the predetermined line voltage is not detected by the first voltage detector, and at the same time, the predetermined voltage is detected by the second voltage detector, the input/output switching circuit is switched to the second switching position and held.

(Voltage Down Signal and Current Up Signal)

The down signal is a voltage signal that changes a line voltage, and the up signal is a current signal that changes a line current.

(Booster Communication Function)

The booster has a unique address and communicates with the receiver.

(Booster Indicator Light)

The booster includes an indicator light indicating a signal amplification direction.

(A Plurality of the Boosters)

A plurality of the boosters are inserted and connected to the loop transmission line.

(Receiver Disconnection Monitoring Function)

The receiver comprising a switching circuit that switches and connects the end of the loop transmission line to the transmission unit, and a disconnection monitoring unit, upon a disconnection failure of the loop transmission line is detected from the line voltage at the end of the loop transmission line, the end of the loop transmission line is switched and connected to the transmission unit by the switching circuit, and the disconnection failure is restored.

(Booster)

The booster is inserted in the middle of a loop transmission line connected to a receiver in a loop, a down signal input from a start side transmission line being amplified and output to a terminal side transmission line, and an up signal input from a terminal side transmission line being amplified and output to the start side transmission line, the improvement, wherein the booster, upon a disconnection failure occurs in the start side transmission line, the input/output is switched to amplify the down signal input from the terminal side transmission line and output to the start side transmission line, and at the same time, the up signal input from the start side transmission line is amplified and output to the terminal side transmission line.

(One-Way Booster)

The booster comprising a down signal boost circuit that amplifies the input down signal in one direction and outputs;

an up signal boost circuit that amplifies the input up signal in one direction and outputs;

a switching circuit having a first switching position and a second switching position, upon the first switching position, the start side transmission line is connected to the input of the down signal boost circuit, and at the same time, the output of the down signal boost circuit is connected to the terminal side transmission line, and the input of the up signal boost circuit is connected to the terminal side transmission line, and at the same time, the output of the up signal boost circuit is connected to the start side transmission line, upon the second switching position, the input of the down signal boost circuit unit is connected to the terminal side transmission line, and at the same time, the output of the up signal boost circuit is connected to the start side transmission line, and the input of the up signal boost circuit is connected to the start side transmission line, and at the same time, the output of the up signal boost circuit is connected to the terminal side transmission line;

a first voltage detector that detects the line voltage of the start side transmission line;

a second voltage detector that detects the line voltage of the terminal side transmission line; and a booster control unit for controlling the input/output switching circuit, upon a predetermined line voltage being detected by the first voltage detector and the second voltage detector, the input/output switching circuit is switched to the first switching position, and upon the predetermined line voltage is not detected by the first voltage detector and at the same time, the predetermined line voltage is detected by the second voltage detector, the input/output switching circuit is switched to the second switching position.

(Bidirectional Booster)

The booster comprising a first down signal boost circuit that amplifies the input down signal in one direction and outputs, a second down signal boost circuit that amplifies the input down signal in the opposite direction and outputs, a first up signal boost circuit that amplifies the input ups signal in one direction and outputs, a second up signal boost circuit that amplifies the input up signal in the opposite direction and outputs, and an input/output switching circuit having a first switching position and a second switching position, upon the first switching position, the input of the first down signal boost circuit is connected to the start side transmission line, and at the same time, the output of the first down signal boost circuit is connected to the terminal side transmission line, and the input of the first up signal boost circuit is connected to the terminal side transmission line, and at the same time, the output of the first up signal boost circuit is connected to the start side transmission line, upon the second switching position, the input of the second down signal boost circuit is connected to the terminal side transmission line, and at the same time, the output of the second down signal boost circuit is connected to the start side transmission line, and the second up signal boost circuit is connected, and the input of the second up signal boost circuit is connected to the start side transmission line, and at the same time, the output of the second up signal boost circuit is switched to the second switching position for connecting to the terminal side transmission line, a first voltage detector that detects the line voltage of the start side transmission line, a second voltage detector that detects the line voltage of the terminal side transmission line, and a booster control unit for controlling the input/output switching circuit, upon a predetermined line voltage is detected by the first voltage detector and the second voltage detector, the input/output switching circuit is switched to the first switching position, and upon the predetermined line voltage is not detected by the first voltage detector and at the same time, the predetermined voltage is detected by the second voltage detector, the input/output switching circuit is switched to the second switching position and held.

Effects of the Invention (Basic Effect)

The present invention relates to a fire alarm system, wherein a fire detector having a unique address is connected to a loop transmission line that is looped to the receiver or repeater which is connected to the receiver, upon a loop transmission line is normal, a transmission unit of the receiver connected to the start end of the loop transmission line communicates with the fire detector to monitor the fire, and upon a disconnection occurs in the loop transmission line, an end of the loop transmission line is connected to the transmission unit to connect to the fire detector from both ends of the loop transmission line, and communication is performed to monitor a fire, the improvement comprising a booster inserted and connected in the middle of the loop transmission line, normally, the booster amplifies a signal input from one side and outputs the signal to the other side, and upon a disconnection occurs in the loop transmission line, the input/output is switched and output, therefore, even if a disconnection failure occurs in the loop transmission line provided in the middle of the booster, fire monitoring by all fire detectors can be continued, and high reliability is ensured.

(Effect of Booster Configuration)

The booster amplifies the down signal input from the start side transmission line and outputs to the terminal side transmission line, and at the same time, amplifies the up signal inputs from the terminal side transmission line and outputs to the start side transmission line, and upon a disconnection failure occurs in the start side transmission line, the input/output switches to amplify the down signal input from the terminal side transmission line and outputs to the start side transmission line and inputs from the start side transmission line, and at the same time, the up signal amplifies and outputs to the terminal side transmission line, therefore, the following effects can be obtained. If a disconnection failure occurs in the start side transmission line, which is the input side of the booster that is inserted and connected in the middle of the loop transmission line and amplifies the signal in one direction, the transmission unit of the receiver switches to signal transmission from both ends of the loop transmission line. At this time, booster switches the input/output to the loop transmission line at its own discretion. By this switching, the up signal input from the terminal side transmission line is amplified and output to the down transmission line on the starting end side that is causing a disconnection failure, and at the same time, the up signal from the start side transmission line can be amplified and output to the terminal side transmission line. Therefore, even if the loop transmission line is provided with a directional booster, all fire detectors connected to the loop transmission lines on both sides of the disconnection failure location are connected to communicate with the receiver's transmission unit. As a result, fire monitoring can be continued by transmitting and receiving the down signal and the up signal.

(Effect of One-Way Booster)

The booster comprising a down signal boost circuit that amplifies the input down signal in one direction and outputs, an up signal boost circuit that amplifies the input up signal in one direction and outputs, a switching circuit having a first switching position and a second switching position, upon the first switching position, the start side transmission line is connected to the input of the down signal boost circuit, and at the same time, the output of the down signal boost circuit is connected to the terminal side transmission line, and the input of the up signal boost circuit is connected to the terminal side transmission line, and at the same time, the output of the up signal boost circuit is connected to the start side transmission line, upon the second switching position, the input of the down signal boost circuit unit is connected to the terminal side transmission line, and at the same time, the output of the up signal boost circuit is connected to the start side transmission line, and the input of the up signal boost circuit is connected to the start side transmission line, and at the same time, the output of the up signal boost circuit is connected to the terminal side transmission line, a first voltage detector that detects the line voltage of the start side transmission line, a second voltage detector that detects the line voltage of the terminal side transmission line, and a booster control unit for controlling the input/output switching circuit, upon a predetermined line voltage being detected by the first voltage detector and the second voltage detector, the input/output switching circuit is switched to the first switching position, and upon the predetermined line voltage is not detected by the first voltage detector, and at the same time, the predetermined line voltage is detected by the second voltage detector, the input/output switching circuit is switched to the second switching position. Therefore, the following effects can be obtained. Booster itself controls based on the detection of the line voltage of the start side transmission line and the terminal side transmission line, upon the loop transmission line is normal or the terminal side transmission line has a disconnection failure, the down signal input from the start side of the loop line is amplified and output toward the end side, and at the same time, the up signal input from the end side is amplified and output toward the start side. However, upon a disconnection failure occurs in the start side transmission line, the down signal and up signal can be switched to signal amplification in the opposite direction. Further, by performing input/output switching amplification, only one boost circuit for the up signal and one boost circuit for the down signal is required, and the circuit configuration can be simplified.

(Effect of Bidirectional Booster)

The booster comprising a down signal boost circuit that amplifies the input down signal in one direction and outputs, an up signal boost circuit that amplifies the input up signal in one direction and outputs, a switching circuit having a first switching position and a second switching position, upon the first switching position, the start side transmission line is connected to the input of the down signal boost circuit, and at the same time, the output of the down signal boost circuit is connected to the terminal side transmission line, and the input of the up signal boost circuit is connected to the terminal side transmission line, and at the same time, the output of the up signal boost circuit is connected to the start side transmission line, upon the second switching position, the input of the second down signal boost circuit is connected to the terminal side transmission line, and at the same time, the output of the second down signal boost circuit is connected to the start side transmission line, and the input of the second up signal boost circuit is connected to the start side transmission line, and at the same time, the output of the second up signal boost circuit is connected to the terminal side transmission line, a first voltage detector that detects the line voltage of the start side transmission line, a second voltage detector that detects the line voltage of the terminal side transmission line, and a booster control unit for controlling the input/output switching circuit, upon a predetermined line voltage being detected by the first voltage detector and the second voltage detector, the input/ output switching circuit is switched to the first switching position, and upon the predetermined line voltage is not detected by the first voltage detector and at the same time, the predetermined line voltage is detected by the second voltage detector, the input/output switching circuit is switched to the second switching position. Therefore, the following effects can be obtained. Booster itself controls based on the detection of the line voltage of the start side transmission line and the terminal side transmission line, upon the loop transmission line is normal or the terminal side transmission line has a disconnection failure, the down signal input from the start side of the loop line is amplified and output toward the end side, and at the same time, the up signal input from the end side is amplified and output toward the start side. However, upon a disconnection failure occurs in the start side transmission line, the down signal and the up signal can be switched to signal amplification in the opposite direction by switching the input/output.

Further, by providing the boost circuit according to the amplification direction, it is possible to set the unique amplification characteristic according to the amplification direction even if there is a difference in the electrical parameters of the transmission line on the input/output side.

(Effect of Voltage Down Signal and Current Up Signal)

In addition, since the down signal is a voltage signal that changes the line voltage and the up signal is a current signal that changes the line current, the voltage down signal and the current up signal are used in half-duplex communication in which the same loop transmission line is switched for transmission and reception therefore. By doing so, the reliability of signal transmission can be improved.

(Effect of Booster Communication Function)

In addition, since the booster has a unique address set and communicates with the receiver, for example, when the receiver recognizes the signal addressed to itself, the operation corresponding to the signal such as replying the status information and switching the signal amplification direction is performed.

(Effect of Booster Indicator Light)

In addition, since the booster includes an indicator light indicating a signal amplification direction, the signal amplification direction can be easily confirmed at the installation location of the booster at the time of inspection or the like.

(A Plurality of the Boosters)

Also, since a plurality of the boosters are inserted and connected to the loop transmission line, upon the loop transmission line is long, two or more boosters will be inserted and connected. However, even if the number of boosters increases, the input/output is switched so that each booster always makes the direction toward the failure occurrence point the amplification direction for the signal transmission from both ends of the loop transmission line due to the occurrence of the disconnection failure. Therefore, even if a disconnection failure occurs, all fire detectors connected to the loop transmission lines on both sides of the occurrence location are connected to communicate with the receiver's transmission unit either directly or via the booster. As a result, fire monitoring can be continued and high reliability is ensured.

(Effect of Receiver Disconnection Monitoring Function)

The receiver comprising a switching circuit that switches and connects the end of the loop transmission line to the transmission unit, and a disconnection monitoring unit, upon a disconnection failure of the loop transmission line is detected from the line voltage at the end of the loop transmission line, the end of the loop transmission line is switched and connected to the transmission unit by the switching circuit, and the disconnection failure is restored. Therefore, upon the disconnection failure of the loop transmission line is determined from the loss of line voltage, the end of the loop transmission line is switched to the transmission unit and connected, and signals are transmitted from both ends of the loop transmission line. This can prevent the loss of the fire monitoring function due to the disconnection failure.

(Effect of Booster)

Since the effect of booster, which is another form of the present invention, is the same as that of booster in the disaster prevention monitoring system [fire alarm system] described above, the description thereof will be omitted.

MODE FOR CARRYING OUT THE INVENTION

[Fire Alarm System]

(Overview of Fire Alarm System)

Figure 1:
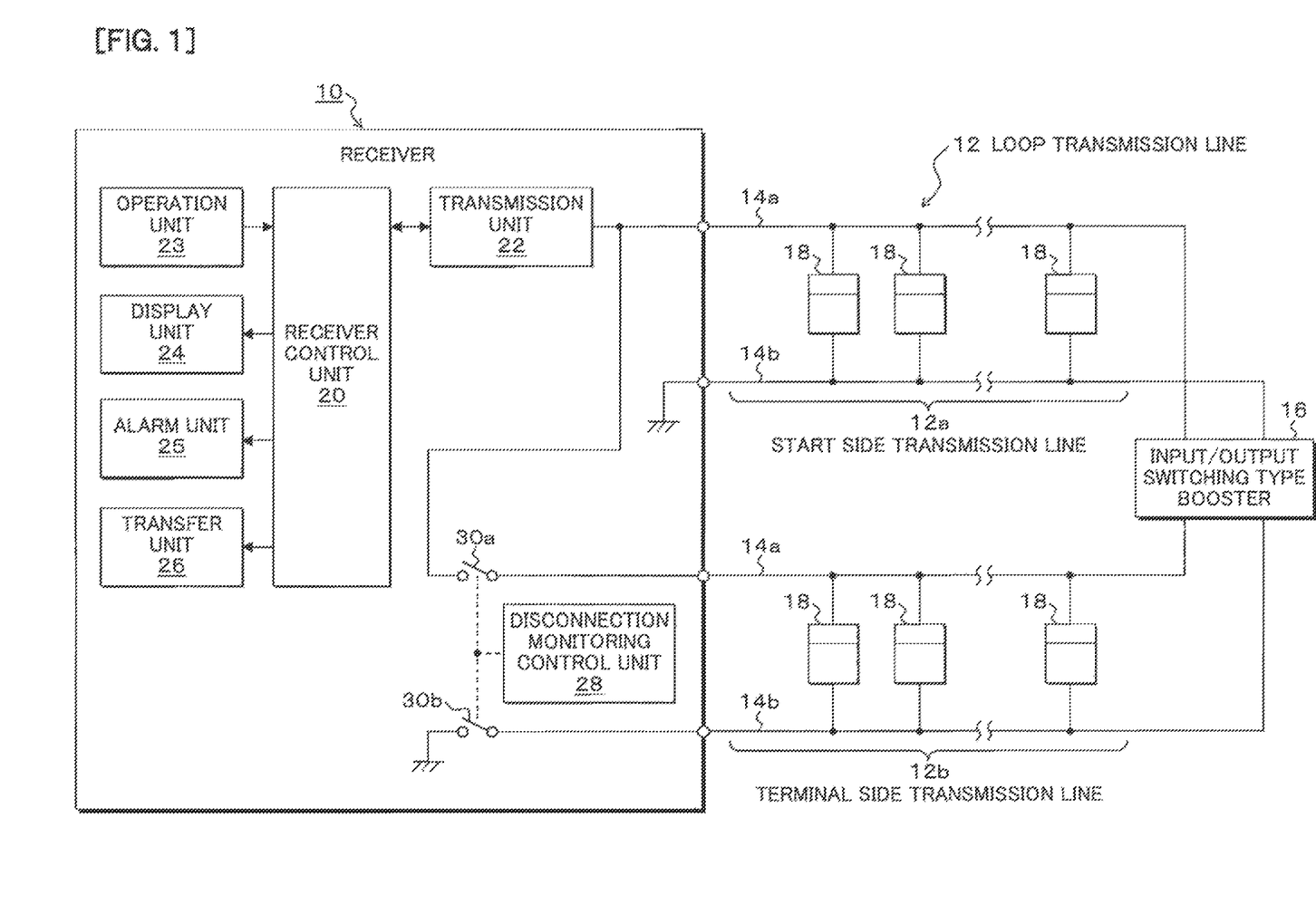
FIG. 1 is an explanatory diagram showing an outline of a fire alarm system in which an input/output switching booster is provided on a loop transmission line.

FIG. 1 is an explanatory diagram showing an outline of a fire alarm system in which an input/output switching booster is provided on a loop transmission line. As shown in FIG. 1, for example, an R-type receiver 10 is installed in a manager's room on the first floor of a building in which a fire alarm system is installed. A loop transmission line 12 using a pair of signal lines 14*a* and 14*b* is drawn out from the receiver 10 with respect to a monitoring area.

A plurality of fire detectors 18 having a transmission function in which unique addresses are set are connected to the loop transmission line 12. An input/output switching booster 16 is inserted and connected at the intermediate position of the loop transmission line 12.

Here, the maximum number of addresses set in the terminal including the fire detector 18 connected to the loop transmission line 12 is, for example, 255. Since the input/output switching booster 16 also corresponds to a terminal having a transmission function, a maximum of 254 fire detectors 18 can be connected to the loop transmission line 12.

(Functional Configuration of Receiver)

The receiver 10 includes a receiver control unit 20, a transmission unit 22, an operation unit 23, a display unit 24, an alarm unit 25, a transfer unit 26, a disconnection monitoring control unit 28, and switching circuits 30*a* and 30*b*.

The receiver control unit 20 is a computer circuit or the like provided with a CPU, a memory, various input/output ports, and the like. The transmission unit 22 transmits/receives a signal to/from the fire detector 18 connected to the loop transmission line 12 according to a predetermined communication protocol.

The down signal from the transmission unit 22 to the fire detector 18 is transmitted in the voltage mode. The signal in this voltage mode is transmitted as a voltage pulse that changes the line voltage of the loop transmission line 12 between, for example, 18 and 30 volts.

On the other hand, the up signal from the fire detector 18 to the receiver 10 is transmitted in the current mode. In this current mode, a signal current is passed through the loop transmission line 12 at the timing of bit 1 of the transmission data, and an up signal is transmitted to the receiver as a so-called current pulse train.

The monitoring control by the receiver control unit 20 of the receiver 10 is as follows. During normal monitoring, the receiver control unit 20 instructs the transmission unit 22 at regular intervals to transmit a broadcast batch AD conversion signal including a batch AD conversion command. The fire detector 18 that has received this batch AD conversion signal detects and holds the smoke concentration or temperature as sensor data. Subsequently, the receiver control unit 20 transmits a call signal including a polling command in which terminal addresses are sequentially specified.

When the fire detector 18 receives the call signal having an address matching its own address, it transmits a response signal including the sensor data held at that time to the receiver 10. When the fire detector 18 detects a fire, it transmits a fire interrupt signal to the receiver 10. When the receiver control unit 20 receives the fire interrupt signal via the transmission unit 22, it transmits a group search command signal to identify the group including the fire detector 18 detecting the fire. Subsequently, the receiver control unit 20 sends an in-group search command signal to identify the address of the fire detector 18 detecting the fire, displays the fire occurrence address, and collects and monitor fire data from the identified fire detector.

The disconnection monitoring control unit 28 detects and monitors the signal voltage obtained at the terminal side of the loop transmission line 12. When a disconnection occurs in the loop transmission line 12, the disconnection monitoring unit 28 detects the disconnection because the signal voltage is interrupted and cannot be detected, and the switching circuits 30a and 30b using the relay contact and the switch element are turned on. As a result, the transmission unit 22 is connected to the terminal side of the loop transmission line 12, and signals are transmitted and received in parallel to the transmission line from both terminal sides of the loop transmission line 12 to the disconnection position to recover from the disconnection failure.

In the normal monitoring state, the input/output switching booster 16 amplifies the down signal (voltage pulse signal) input from the start side transmission line 12a and outputs it to the terminal side transmission line 12b. Further, the up signal (current pulse signal) input from the terminal side transmission line 12b is current-amplified and output to the start side transmission line 12a. The input/output switching booster 16 is a terminal side on the condition that when a disconnection failure occurs in the start side transmission line 12a, the terminal side of the loop transmission line 12 is connected to the transmission unit 22 by the operation of the switching circuits 30a and 30b by the disconnection monitoring control unit 28. The down signal (voltage pulse signal) input from the transmission line 12b is voltage-amplified and output to the start side transmission line 12a. Further, the input/output is switched so that the up signal (current pulse signal) input from the start side transmission line 12a side is current-amplified and output to the terminal side transmission line 12b.

The input/output switching booster 16 is provided with an emergency battery that operates by supplying power from a commercial power source, and is further supplied with power during normal times and functions as an operating power source during a power failure.

The input/output switching booster 16 operates by supplying power from a commercial power source, and is equipped with an indicator light that displays status information such as the power supply status and signal amplification direction.

The input/output switching booster 16 has a unique address, and when it recognizes a signal assigned to itself from the receiver, it performs an operation corresponding to a signal such as returning status information and switching the signal amplification direction.

The input/output switching booster 16 includes a circuit for short circuit protection

[Input/Output Switching Booster]

Figure 2:
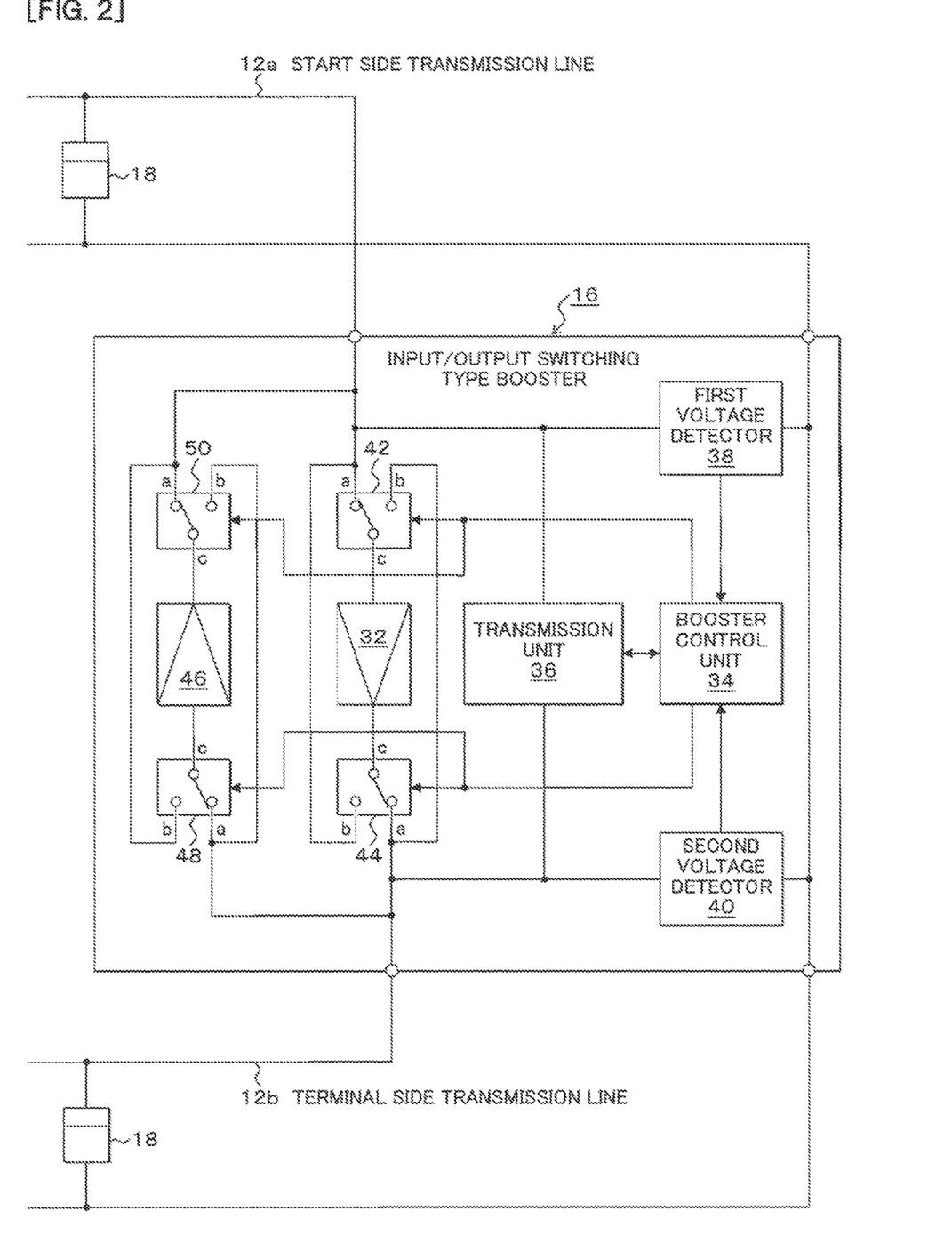
FIG. 2 is a block diagram showing an embodiment of an input/output switching booster.

FIG. 2 is a block diagram showing an embodiment of an input/output switching booster. As shown in FIG. 2, the input/output switching booster 16 includes a down signal boost circuit (voltage boost circuit unit) 32, an up signal boost circuit (current boost circuit unit) 46, a booster control unit 34, a transmission unit 36, and a first voltage detector 38, a second voltage detector 40, a down signal input/output switching circuit 42, 44, and an up signal input/output switching circuit 48, 50. The down signal boost circuit 32 functions as a voltage boost circuit unit, and the up signal boost circuit 46 functions as a current boost circuit.

The voltage boost circuit unit 32 is a circuit that amplifies and outputs a voltage pulse signal, which is an input down signal, in one direction, and includes a voltage amplifier and a waveform shaping circuit.

The current boost circuit unit 46 is a circuit that amplifies the current pulse signal, which is an input up signal, in one direction and outputs the current pulse signal, and includes a current amplifier and a waveform shaping circuit.

The down signal input/output switching circuits 42 and 44 are composed of switching relay contacts or switching elements such as FETs. The down signal input/output switching circuit 42 is provided on the input side of the voltage boost circuit unit 32, and the positive side of the start side transmission line 12a is connected to the switching terminal a, the positive side of the terminal side transmission line 12b is connected to the switching terminal b, and an input of the voltage boost circuit unit 32 is connected to the terminal c.

The down signal input/output switching circuit 44 is provided on the output side of the voltage boost circuit unit 32, and the positive side of the terminal side transmission line 12b is connected to the switching terminal a, the positive side of the start side transmission line 12a is connected to the switching terminal b, and an output of the voltage boost circuit unit 32 is connected to the terminal c.

In the down signal input/output switching circuits 42 and 44, the switching terminal a side is the first switching position and the switching terminal b side is the second switching position. Therefore, when the down signal input/output switching circuits 42 and 44 are the first switching positions shown as the switching terminals a, the start side transmission line 12a is connected to an input of the down signal boost circuit 32, and the terminal side transmission line b is connected to an output of the down signal boost circuit 32. When the down signal input/output switching circuits 42 and 44 are in the second switching position where the switching terminals b are used, the terminal side transmission line 12b is connected to the input of the down signal boost circuit 32, and the start side transmission line 12a is connected to the output of the down signal boost circuit 32.

The up signal input/output switching circuits 48 and 50 are composed of switching relay contacts or switching elements such as FETs. The up signal input/output switching circuit 48 is provided on the input side of the up signal boost circuit 46, the positive side of the terminal side transmission line 12b is connected to a switching terminal a, the positive side of the start side transmission line 12a is connected to a switching terminal b, and the input of up signal boost circuit 46 is connected to a common terminal c.

The up signal input/output switching circuit 50 is provided on the output side of the up signal boost circuit 46, the positive side of the start side transmission line 12a is connected to a switching terminal a, the positive side of the terminal side transmission line 12b is connected to a switching terminal b, and the output of the up signal boost circuit 46 is connected to a common terminal c.

In the up signal input/output switching circuits 48 and 50, the switching terminal a side is the first switching position, and the switching terminal b is the second switching position. Therefore, when the up signal input/output switching circuits 48 and 50 are the first switching positions shown as the switching terminals a, the input of the up signal boost circuit 46 is connected to the terminal side transmission line 12b, and the output of the up signal boost circuit 46 is connected to the start side transmission line 12a. When the up signal input/output switching circuits 48 and 50 are in the second switching position where the switching terminal b is used, the input of the up signal boost circuit 46 is connected to the start side transmission line 12a, and the output of the up signal boost circuit 46 is connected to the terminal side transmission line 12b.

The first voltage detector 38 detects a line voltage of the start side transmission line 12a and outputs it to the booster control unit 34. The second voltage detector 40 detects a line voltage of the terminal side transmission line 12b and outputs it to the booster control unit 34.

The booster control unit 34 is composed of a computer circuit including a CPU, a memory, and various input/output ports, and performs input/output switching control by executing a program by the CPU. When a predetermined line voltage is detected by the first voltage detector 38 and the second voltage detector 40 (when the loop transmission line 12 is normal or the terminal side transmission line 12b is disconnected), the booster control unit 34 performs input/output switching control. This input/output switching control switches the down signal input/output switching circuits 42 and 44 and the up signal input/output switching circuits 48 and 50 to the first switching position on the switching terminal a side shown in the figure. Therefore, the down signal input from the start side transmission line 12a is voltage-amplified by the down signal boost circuit 32 and output toward the terminal side transmission line 12b. Further, the up signal input from the terminal side transmission line 12b is current-amplified by the up signal boost circuit 46 and output toward the start side transmission line 12a.

When a condition that the predetermined line voltage is not detected by the first voltage detector 42 due to the disconnection of the start side transmission line 12a is satisfied and when the terminal of the loop transmission line 12 is connected to the transmission unit 22 by the operation of the switching circuits 30a and 30b by the disconnection monitoring control unit 28, and the condition that the predetermined line voltage is detected by the second voltage detector 40 is satisfied, the booster control unit 34 switches the outputs switching circuits 42 and 44 and the up signal input/output switching circuits 48 and 50 to the second switching position on the switching terminal b side. Subsequently, the up signal input from the start side transmission line 12a is current-amplified and output toward the terminal side transmission line 12b.

[Operation when the Loop Line is Disconnected]

(Start Side Transmission Line Disconnection)

Figure 3:
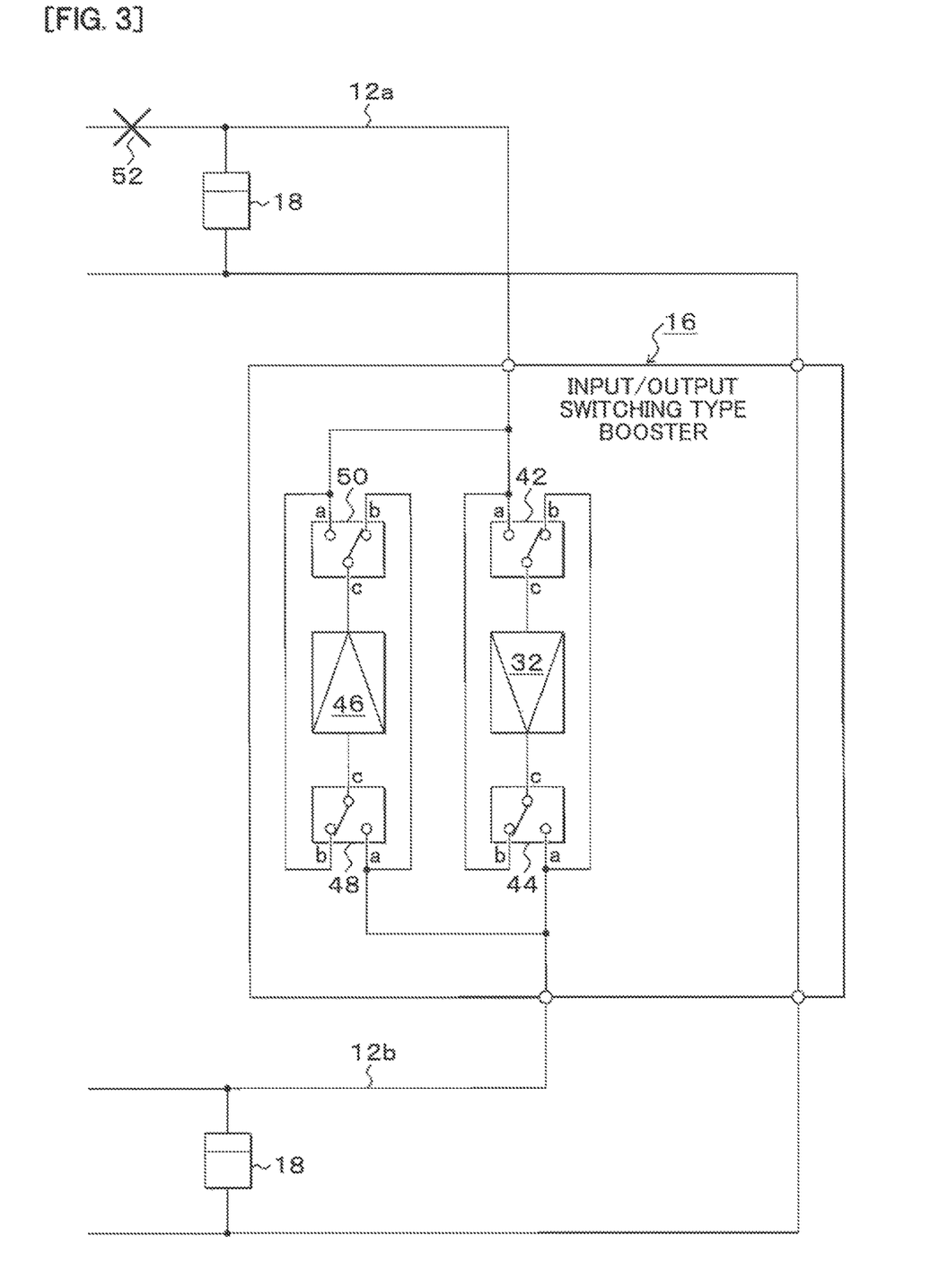
FIG. 3 is a block diagram showing the operation of the input/output switching booster when a disconnection failure occurs on the start side transmission line.

FIG. 3 is a block diagram showing the operation of the input/output switching booster when a disconnection failure occurs in the start side transmission line. The booster control unit 34, transmission unit 36, first voltage detector 38, and second voltage detector 40 shown in FIG. 2 are shown are omitted.

In the normal monitoring state in which the loop transmission line 12 is not disconnected, as shown in FIG. 2, the down signal input/output switching circuits 42 and 44 and the up signal input/output switching circuits 48 and 50 are switched to the switching terminal a side as the first switching position. As a result, the down signal input from the start side transmission line 12a is voltage-amplified by the down signal boost circuit 32 and output toward the terminal side transmission line 12b. Further, the up signal input from the terminal side transmission line 12b is current amplified by the up signal boost circuit 46 and output toward the start side transmission line 12a.

In this state, as shown in FIG. 3, it is assumed that the disconnection 52 occurs at the start side transmission line 12a. At this time, the disconnection monitoring control unit 28 of the receiver 10 shown in FIG. 1 detects that the line voltage at the terminal side of the loop transmission line 12 is interrupted by the disconnection 52, turns on the switching circuits 30a and 30b, and the transmission unit 22 is connected to the terminal side of the loop transmission line 12. Therefore, the down signal output from the transmission unit 22 is transmitted from both the start side and the terminal side of the loop transmission line 12 to the location where the disconnection 52 in FIG. 3 occurs.

At this time, the first voltage detector 38 of the input/output switching booster 16 cannot detect the predetermined line voltage due to the disconnection 52. Further, in the second voltage detector 40, a predetermined line voltage is detected by connecting the terminal side of the loop transmission line 12 to the transmission unit 22. As a result, as shown in FIG. 3, the booster control unit 34 switches the down signal input/output switching circuits 42 and 44 and the up signal input/output switching units 48 and 50 to the second switching positions on the switching terminal b side, respectively. As a result, the down signal input from the terminal side transmission line 12b is voltage-amplified by the down signal boost circuit 32 and output toward the start side transmission line 12a where the disconnection 52 is generated. Further, the up signal input from the start side transmission line 12a in which the disconnection 52 is generated is current-amplified by the up signal boost circuit 46 and output toward the terminal side transmission line 12b.

Therefore, even if a disconnection 52 occurs in the start side transmission line 12a of the loop transmission line 12, the down signal and the up signal can be transmitted and received between all the fire detectors 18 connected to the loop transmission line 12 and the transmission unit 22 of the receiver 10. Therefore the fire monitoring function of the fire detector 18 is not lost.

The disconnection 52 is a disconnection of the signal cable used for the loop transmission line 12, and is shown as a disconnection 52 of the signal line on the plus side in FIG. 3. However, the above effect can be obtained even when both the positive side and the negative side signal lines, which are generally generated, are disconnected.

(Disconnection of Terminal Side Transmission Line)

Figure 4:
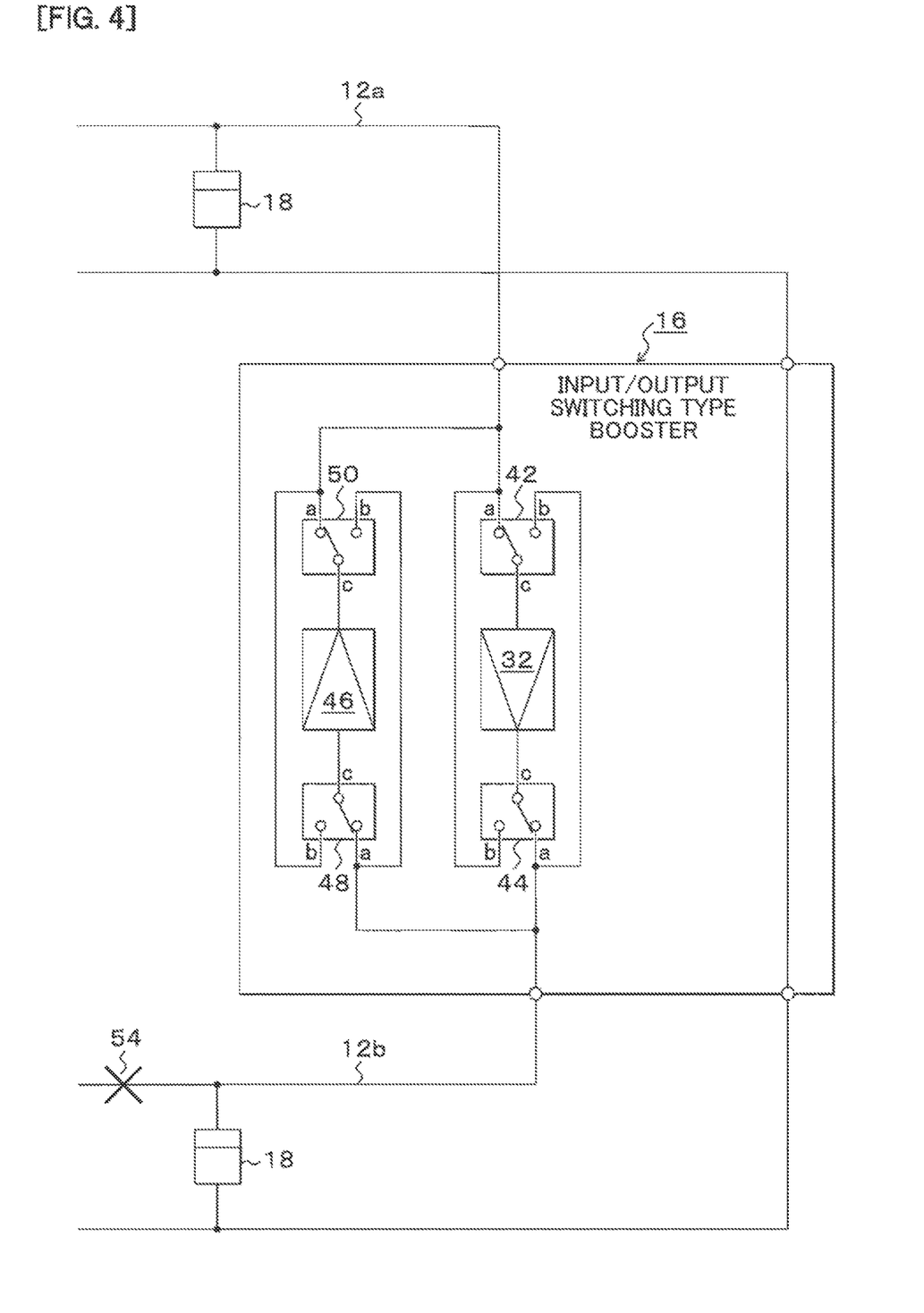
FIG. 4 is a block diagram showing the operation of the input/output switching booster in the normal monitoring state and when a disconnection failure occurs in the terminal side transmission line.

FIG. 4 is a block diagram showing the operation of the input/output switching booster in the normal monitoring state and when a disconnection failure occurs in the terminal side transmission line. The booster control unit 34, transmission unit 36, first voltage detector 38, and second voltage detector 40 shown in FIG. 2 are omitted.

As shown in FIG. 4, the down signal input/output switching circuits 42 and 44 and the up signal input/output switching circuits 48 and 50 are switched to the first switching position on the switching terminal a side. Assuming that a disconnection 54 occurs at the terminal side transmission line 12b in this normal monitoring state, the disconnection monitoring control unit 28 of the receiver 10 shown in FIG. 1 detects that the line voltage at the end of the loop transmission line 12 is interrupted due to the disconnection 52. Then, the switching circuits 30a and 30b are turned on, and the transmission unit 22 is connected to the terminal side of the loop transmission line 12. Therefore, the down signal output from the transmission unit 22 is transmitted from both the start side and the terminal side of the loop transmission line 12 to the location where the disconnection 54 in FIG. 3 occurs.

At this time, the first voltage detector 38 of the input/output switching booster 16 detects a predetermined line voltage without being affected by the disconnection 54 of the terminal side transmission line 12b. Further, since the second voltage detector 40 is applied with a voltage by outputting a signal in the downward direction from the booster, the open end is only changed from the switching circuit 30a to the disconnection point, and a predetermined line voltage is detected. This is the same as the normal state without disconnection in the loop transmission line 12. Therefore, the booster control unit 34 maintains the switching of the first switching position on the switching terminal a side of the down signal input/output switching circuits 42 and 44 and the up signal input/output switching circuits 48 and 50.

That is, the disconnection 54 of the terminal side transmission line 12b can be recovered only by the control of turning on the switching circuits 30a and 30b by the disconnection monitoring control unit 28 of the receiver 10 and connecting the transmission unit 22 to the end of the loop transmission line 12.

Other Embodiments of Input/Output Switching Booster

Figure 5:
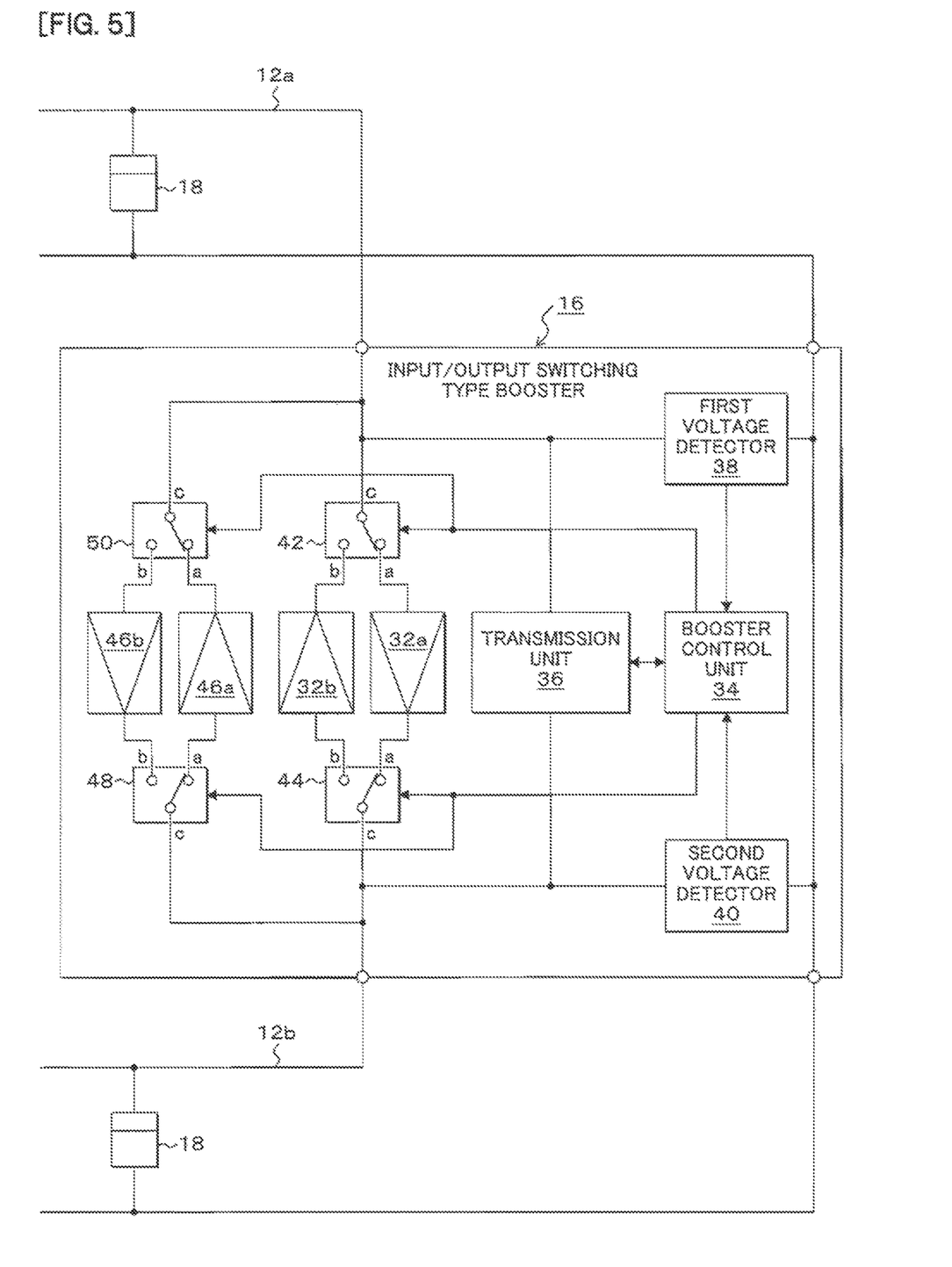
FIG. 5 is a block diagram showing another embodiment of the input/output switching booster.

FIG. 5 is a block diagram showing another embodiment of the input/output switching booster. As shown in FIG. 5, the input/output switching booster 16 of the present embodiment has a first down signal boost circuit 32a and a terminal that amplify the down signal input from the start side transmission line 12a in one direction and output it to the terminal side transmission line 12b, a second down signal boost circuit 32b that amplifies the down signal input from the side transmission line 12b in the opposite direction and outputs it to the start side transmission line 12a, a first up signal boost circuit 46a, which amplifies the up signal input from the terminal side transmission line 12b in one direction and outputs it to the start side transmission line 12a, and a second up signal boost circuit 46b, which amplifies the up signal input from the start side transmission line 12a in the reverse direction and outputs it to the terminal side transmission line 12b. The down signal input/output switching circuits 42 and 44 are provided for the first down signal boost circuit 32a and the second down signal boost circuit 32b. Further, up signal input/output switching circuits 48 and 50 are provided for the first up signal boost circuit 46a and the second up signal boost circuit 46b.

If there is no disconnection in the loop transmission line 12 or if a disconnection occurs in the terminal side transmission line 12b, the booster control unit 34 will perform a down signal input/output switching circuit 42 based on the detection of the predetermined line voltage by the first voltage detector 38 and the second voltage detector 40, and up signal input/output switching circuits 48, 50 are switched to the first switching position on the switching terminal a side. As a result, the first down signal boost circuit 32a is inserted and connected to the loop transmission line 12, and the down signal input from the start side transmission line 12a is voltage-amplified and output to the terminal side transmission line 12b. Further, the first up signal boost circuit 46a is inserted and connected to the loop transmission line 12, and the up signal input from the terminal side transmission line 12b is current-amplified and output to the start side transmission line 12a.

On the other hand, when the start side transmission line 12a is disconnected, the first voltage detector 38 does not detect the predetermined line voltage, and the second voltage detector 40 detects the predetermined line voltage. Based on this, the booster control unit 34 switches the down signal input/output switching circuits 42 and 44 and the up signal input/output switching circuits 48 and 50 to the second switching position on the switching terminal b side. As a result, the second down signal boost circuit 32b is inserted and connected to the loop transmission line 12, and the down signal input from the terminal side transmission line 12b is voltage-amplified and output to the start side transmission line 12a. Further, the second up signal boost circuit 46b is inserted and connected to the loop transmission line 12, and the up signal input from the end side transmission line 12a is current-amplified and output to the terminal side transmission line 12b.

Since the other configurations and functions are the same as those of the embodiment shown in FIG. 2, the same reference numerals are given and the description thereof will be omitted.

In this way, a dedicated first downlink signal boost circuit 32a and a second downlink signal boost circuit 32b, and a dedicated first uplink signal boost circuit 46a and a second uplink signal boost circuit 46b are provided according to the transmission direction of the loop transmission line 12, therefore, if the input/output switching booster 16 is not provided at a position deviated from the midpoint of the loop transmission line 12, the electrical characteristics including the resistance of the start side transmission line 12a and the terminal side transmission line 12b are different. Even if the electrical characteristics are different in this way, the amplification factor suitable for the electrical characteristics of the transmission line on the output side is individually set to enable the optimum signal amplification transmission. The amplification factor may be set by using a known variable resistor.

[Modification of the Present Invention]

In the above embodiment, a disconnection failure is taken as an example, but even if the system intentionally disconnects the wire, the booster operates as if it were disconnected. This is a case where the short-circuited portion of the circuit is disconnected by the operation of the short-circuit isolator, for example.

In the above embodiment, the loop transmission line is drawn from the receiver, but the sensor and booster may be connected to the loop transmission line drawn from the repeater connected to the receiver.

In the above embodiment, the loop wiring is drawn from the receiver, but the sensor and booster may be connected to the loop wiring drawn from the repeater connected to the receiver.

In addition to the above embodiments, the input/output switching booster 16 may insulate the input and output. For example, the amplification unit is insulated from the input terminal and the voltage detector 38 by a photo-coupler or the like, and the output terminal and the voltage detector 40 and the amplification part are insulated by a photo-coupler or the like. By insulating the input/output terminals, it is possible to prevent the signal output of the booster and the signal output of the receiver side from colliding with each other, which occurs when only the GND line is disconnected.

In addition to the above embodiments, the fire alarm system may have an automatic test function. For example, it is confirmed that the signal amplification direction of the input/output switching booster 16 is reversed when the output of the transmission unit 22 is stopped only on the starting end side and the switching circuits 30a and 30b are turned on. Further, a signal may be transmitted from the receiver to the input/output switching booster 16 to switch the amplification direction.

The above embodiment takes as an example the fire alarm system in which the R-type fire detector is connected via the loop transmission line from the R-type receiver, but same can be applied to a fire alarm system in which an addressable fire detector whose address can be set and which has a transmission function is connected via a loop transmission line from a P-type receiver.

Further, the present invention includes appropriate modifications that do not impair its objects and advantages, and is not further limited by the numerical values shown in the above embodiments.

DESCRIPTION OF REFERENCE NUMERALS

10: receiver
12: loop transmission line
12a: start side transmission line
12b: terminal side transmission line
14a, 14b: signal line
16: input/output switching booster
18: fire detector
20: receiver control unit
22, 36: transmission unit
28: disconnection monitoring control unit
30a, 30b: switching circuit
32: down signal boost circuit
32a: first down signal boost circuit
32b: second down signal boost circuit
34: booster control unit
38: first voltage detector
40: second voltage detector
42, 44: down signal input/output switching circuit
46: up signal boost circuit
46a: first up signal boost circuit
46b: second up signal boost circuit
48, 50: up signal input/output switching circuit

The invention claimed is:

1. A booster inserted in the middle of a loop transmission line connected in a loop, comprising:
   a down signal boost circuit that amplifies an input down signal in one direction and outputs;
   an up signal boost circuit that amplifies an input up signal in one direction and outputs;
   a switching circuit having a first switching position and a second switching position,
   upon the first switching position, a start side transmission line is connected to the input of the down signal boost circuit, and at the same time, the output of the down signal boost circuit is connected to a terminal side transmission line, and the input of the up signal boost circuit is connected to the terminal side transmission line, and at the same time, the output of the up signal boost circuit is connected to the start side transmission line,
   upon the second switching position, the input of the down signal boost circuit is connected to the terminal side transmission line, and at the same time, the output of the down signal boost circuit is connected to the start side transmission line, and the input of the up signal boost circuit is connected to the start side transmission line, and at the same time, the output of the up signal boost circuit is connected to the terminal side transmission line;
   a first voltage detector that detects the line voltage of the start side transmission line;
   a second voltage detector that detects the line voltage of the terminal side transmission line; and
   a booster control unit for controlling the input/output switching circuit,
   upon a predetermined line voltage being detected by the first voltage detector and the second voltage detector, the input/output switching circuit is switched to the first switching position, and
   upon the predetermined line voltage is not detected by the first voltage detector and at the same time, the predetermined line voltage is detected by the second voltage detector, the input/output switching circuit is switched to the second switching position.

2. The booster according to claim 1,
   wherein the loop transmission line is connected in a loop to a receiver or a repeater connected to a receiver of a fire alarm system, and connects a fire detector.

3. The booster according to claim 1,
   wherein the down signal is a voltage signal that changes the line voltage, and the up signal is a current signal that changes the line current.

4. The booster according to claim 1,
   wherein the booster has a unique address.

5. The booster according to claim 1,
   wherein the booster includes an indicator light indicating a signal amplification direction.

6. The booster according to claim 1,
   wherein a plurality of the boosters are inserted and connected to the loop transmission line.

7. A booster inserted in the middle of a loop transmission line connected in a loop, comprising:
   a first down signal boost circuit that amplifies an input down signal in one direction and outputs;
   a second down signal boost circuit that amplifies an input down signal in the opposite direction and outputs;
   a first up signal boost circuit that amplifies the input ups signal in one direction and outputs;

a second up signal boost circuit that amplifies the input up signal in the opposite direction and outputs;

an input/output switching circuit having a first switching position and a second switching position, upon the first switching position, the input of the down signal boost circuit is connected to a start side transmission line, and at the same time, the output of the first down signal boost circuit is connected to a terminal side transmission line, and the input of the first up signal boost circuit is connected to the terminal side transmission line, and at the same time, the output of the first up signal boost circuit is connected to the start side transmission line, upon the second switching position, the input of the second down signal boost circuit is connected to the terminal side transmission line, and at the same time, the output of the second down signal boost circuit is connected to the start side transmission line, and the input of the second up signal boost circuit is connected to the start side transmission line, and at the same time, the output of the second up signal boost circuit is switched to the second switching position for connecting to the terminal side transmission line;

a first voltage detector that detects the line voltage of the start side transmission line;

a second voltage detector that detects the line voltage of the terminal side transmission line; and a booster control unit for controlling the input/output switching circuit, upon a predetermined line voltage is detected by the first voltage detector and the second voltage detector, the input/output switching circuit is switched to the first switching position, and upon the predetermined line voltage is not detected by the first voltage detector, and at the same time, the predetermined voltage is detected by the second voltage detector, the input/output switching circuit is switched to the second switching position and held.

8. The booster according to claim 7,
wherein the loop transmission line is connected in a loop to a receiver or a repeater connected to a receiver of a fire alarm system, and connects a fire detector.

9. The booster according to claim 7,
wherein the down signal is a voltage signal that changes the line voltage, and the up signal is a current signal that changes the line current.

10. The booster according to claim 7,
wherein the booster has a unique address.

11. The booster according to claim 7,
wherein the booster includes an indicator light indicating a signal amplification direction.

12. The booster according to claim 7,
wherein a plurality of the boosters are inserted and connected to the loop transmission line.

* * * * *